(12) United States Patent
Cook et al.

(10) Patent No.: US 9,990,117 B2
(45) Date of Patent: Jun. 5, 2018

(54) ZOOMING AND PANNING WITHIN A USER INTERFACE

(71) Applicant: Lenovo (Singapore) Pte. Ltd., New Tech Park (SG)

(72) Inventors: Thomas Ryan Cook, Raleigh, NC (US); Jeffrey E. Skinner, Raleigh, NC (US); Aaron Michael Stewart, Raleigh, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 14/818,120

(22) Filed: Aug. 4, 2015

(65) Prior Publication Data
US 2017/0038947 A1 Feb. 9, 2017

(51) Int. Cl.
| G09G 5/00 | (2006.01) |
| G06F 3/0484 | (2013.01) |
| G06F 3/0488 | (2013.01) |
| G06F 3/0485 | (2013.01) |
| G06F 3/0486 | (2013.01) |

(52) U.S. Cl.
CPC ........ *G06F 3/04842* (2013.01); *G06F 3/0485* (2013.01); *G06F 3/0486* (2013.01); *G06F 3/0488* (2013.01); *G06F 3/04847* (2013.01); *G06F 2203/04806* (2013.01)

(58) Field of Classification Search
None
See application file for complete search history.

(56) References Cited

U.S. PATENT DOCUMENTS

| 5,717,879 | A | 2/1998 | Moran et al. | |
|---|---|---|---|---|
| 6,118,888 | A | 9/2000 | Chino et al. | |
| 2008/0165255 | A1* | 7/2008 | Christie | G06F 3/04883 348/207.99 |
| 2010/0289825 | A1* | 11/2010 | Shin | G06F 3/04845 345/667 |
| 2011/0001628 | A1* | 1/2011 | Miyazawa | G01C 21/3664 340/686.1 |
| 2011/0007029 | A1* | 1/2011 | Ben-David | G06F 3/044 345/174 |
| 2012/0268391 | A1* | 10/2012 | Somers | G06F 1/1694 345/173 |

(Continued)

OTHER PUBLICATIONS

Unknown Author; Warcraft Orc & Humans, Copyright 1994-1995, Blizzard Entertainment, pp. 1-15.*

(Continued)

*Primary Examiner* — Peter Hoang
(74) *Attorney, Agent, or Firm* — John L. Rogitz; John M. Rgitz

(57) ABSTRACT

In one aspect, a device includes a processor, a display accessible to the processor, and storage accessible to the processor. The storage bears instructions executable by the processor to present a first portion of a user interface (UI) on the display and receive user input to present an expanded view of the UI and/or to pan within the UI. The instructions are also executable to, in response to receipt of the user input present the expanded view of the UI and present, in the expanded view, an indication of a location of the first portion.

19 Claims, 8 Drawing Sheets

(56) References Cited

U.S. PATENT DOCUMENTS

| | | | | |
|---|---|---|---|---|
| 2013/0100162 A1* | 4/2013 | Iseri | ............ | G09G 5/14 |
| | | | | 345/629 |
| 2013/0177296 A1* | 7/2013 | Geisner | ............ | H04N 9/80 |
| | | | | 386/241 |
| 2013/0236093 A1* | 9/2013 | Gatt | ............ | G06F 3/0484 |
| | | | | 382/167 |
| 2013/0297206 A1* | 11/2013 | Heng | ............ | G01C 21/00 |
| | | | | 701/532 |
| 2014/0013234 A1* | 1/2014 | Beveridge | ............ | G06F 3/0484 |
| | | | | 715/740 |
| 2014/0089847 A1* | 3/2014 | Seo | ............ | G06F 3/04842 |
| | | | | 715/800 |
| 2014/0168277 A1* | 6/2014 | Ashley | ............ | G06F 3/1446 |
| | | | | 345/672 |
| 2014/0362119 A1* | 12/2014 | Freund | ............ | G06F 3/017 |
| | | | | 345/661 |
| 2015/0378665 A1* | 12/2015 | Han | ............ | G06F 3/1462 |
| | | | | 345/2.2 |

OTHER PUBLICATIONS

Aaron Michael Stewart, Jonanthan Jen-Wei Yu, Thomas Ryan Cook, Jeffrey E. Skinner, "Toggling Between Presentation and Non-Presentation of Representatives of Input", file history of related U.S. Appl. No. 15/007,344, filed Jan. 27, 2016.

Aaron Michael Stewart, Jonathan Jen-Wei Yu, Thomas Ryan Cook, Jeffrey E Skinner, "Toggling Between Presentation and Non-Presentation of Representations of Input", related U.S. Appl. No. 5/007,344, Non-Final Office Action dated Mar. 8, 2018.

* cited by examiner

ZOOMING AND PANNING WITHIN A USER INTERFACE

FIELD

The present application relates generally to zooming and panning within a user interface (UI).

BACKGROUND

It is difficult to navigate windows and user interfaces (UI) on relatively small devices such as smart phones when a relatively large amount of zoom is needed in order to comfortably view information on the window or UI, but where there may also be other information off screen that the user wishes to view but does not know precisely where it is located in the window or UI. There are currently no adequate or efficient ways to locate and view such information.

SUMMARY

Accordingly, in one aspect a device includes a processor, a display accessible to the processor, and storage accessible to the processor. The storage bears instructions executable by the processor to present a first portion of a user interface (UI) on the display and receive user input to present an expanded view of the UI. The instructions are also executable to, in response to receipt of the user input, present the expanded view of the UI and present, in the expanded view of the UI, an indication of a location in the expanded view of the first portion of the UI.

In another aspect, a method includes presenting a first portion of a user interface (UI) on a display of a device and receiving user input to zoom out in the UI. The method also includes, in response to receiving the user input, zooming out in the UI to show at least one additional portion of the UI beyond the first portion and presenting an indication of a location of the first portion of the UI.

In still another aspect, a computer readable storage medium that is not a transitory signal comprises instructions executable by a processor to present a first portion of a window on a display of a device and receive user input to pan within the window. The instructions are also executable to, in response to receipt of the user input, present an expanded view of the window which shows at least one additional portion of the window other than the first portion and present an indication within the expanded view of a location of the first portion.

The details of present principles, both as to their structure and operation, can best be understood in reference to the accompanying drawings, in which like reference numerals refer to like parts, and in which:

DETAILED DESCRIPTION

Figure 1:
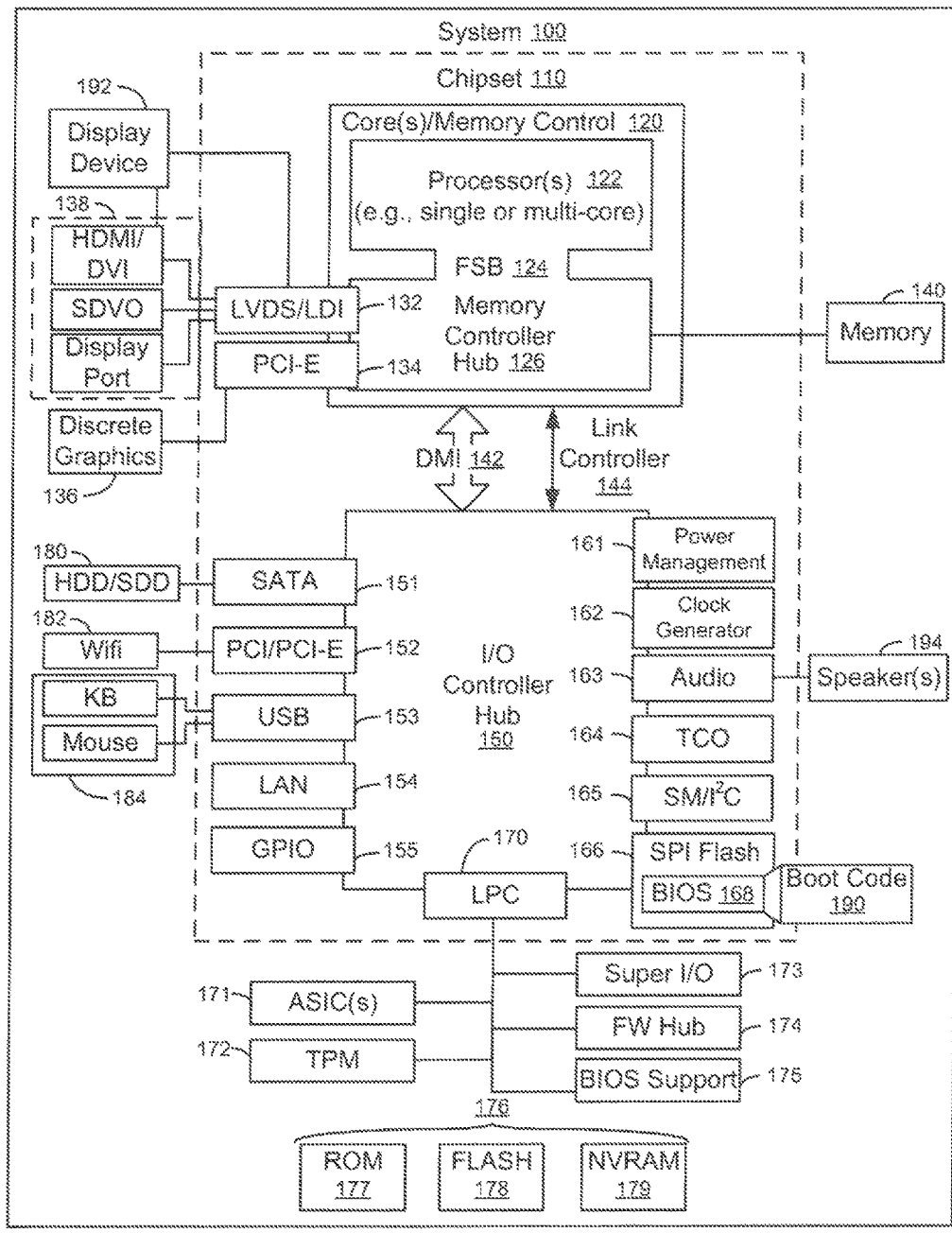
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and oilier mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or snore of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange Information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interlace (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processors) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, an audio receiver/microphone providing input to the processor 122 based on, e.g., a user providing audible input to the microphone, and a camera for gathering one or more images and providing input related thereto to the processor 122. The camera may be a thermal imaging camera, a digital camera, such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
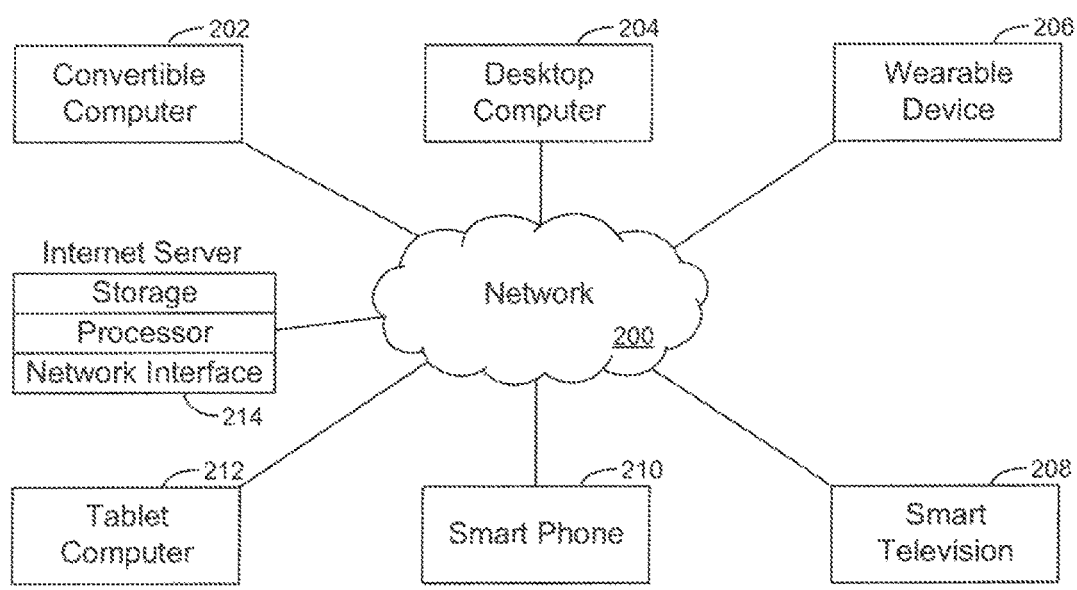
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as the Internet in accordance with present principles. It is to be understood that each of the devices described in reference to FIG. 2 may include at least same of the features, components, and/or elements of the system 100 described above. In any case, FIG. 2 shows a notebook computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
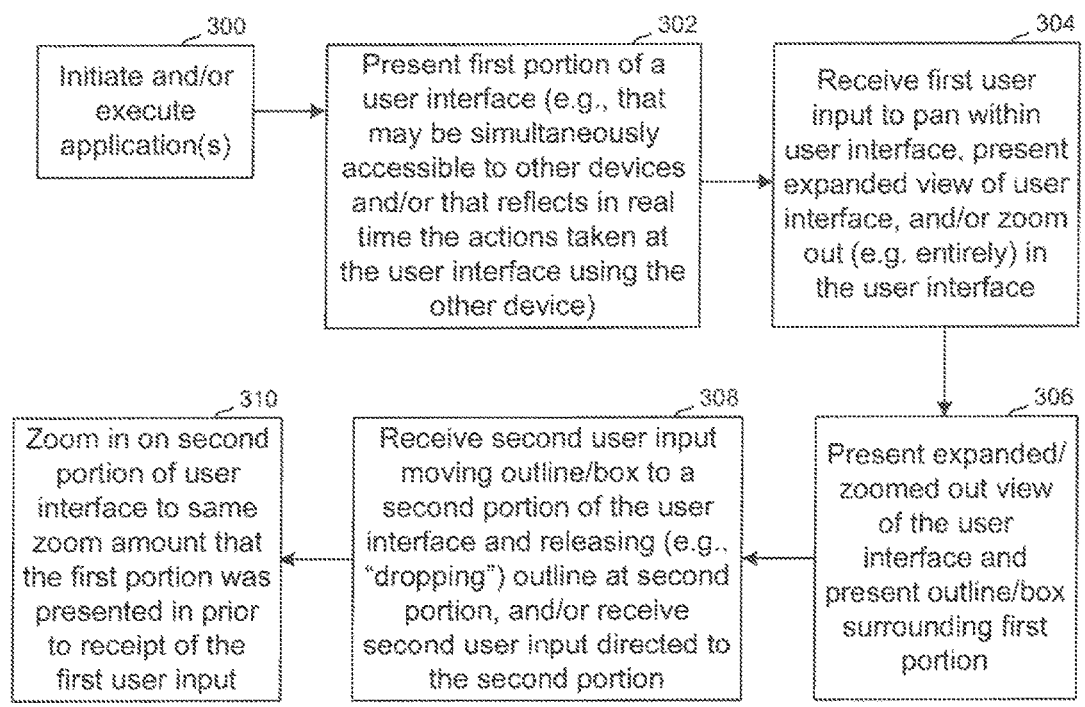
FIG. 3 is a flow chart showing an example algorithm in accordance with present principles.

Referring to FIG. 3, it shows example logic that may be undertaken by a device such as the system 100 in accordance with present principles (referred to below as the "present device"). Beginning at block 300, the logic initiates and/or executes one or more applications for undertaking present principles, such as an application generating the user interface(s) (UIs) discussed herein, an application for zooming in and out in UIs as discussed herein, etc. The logic then proceeds to block 302 where the logic presents, on a display accessible to the present device, a first portion of a UI (e.g. a canvas/drawing UI, an Internet browser UI, an electronic map, etc.) but not the entirety of the UI. In some embodiments, the UI may be simultaneously accessible to the present device and to one or more other devices for editing and/or manipulating of the UI. Accordingly, and also in some embodiments, the UI may reflect (in real time, or at least substantially in real time (e.g., as fast as the present device may exchange Information with the other device)) actions taken at the UI (e.g., changes to the UI, input to the UI, etc.) using other devices.

After block 302 the logic proceeds to block 304 where the logic receives first user input one or more of to pan (e.g., move in a certain direction) within the UI to another portion of the UI other than the first portion, to present an expanded view and/or full thumbnail view of the UI (and/or of the content layout) including at least one area other than the first portion, and/or to zoom out in the UI (e.g., entirely so that the entire UI is presented on the display of the present device at once). Responsive to the first user input received at block 304, the logic moves to block 306 where it presents an expanded and/or zoomed out view of the UI and presents an outline and/or box surrounding the first portion and hence indicating its location in the expanded UI.

After block 308, the logic moves to block 308 where the logic receives second user input moving (e.g., dragging) the outline/box at least partially away from the area at which it is initially presented and releasing it (e.g., dropping) on or over a second portion of the UI. In addition to or in lieu of moving and releasing, the outline/box may be moved to the second portion by merely selecting the second portion (e.g., clicking on it with a mouse, touching/tapping it if the display is touch-enabled, etc.) or by first selecting the outline/box (or an area inside the outline/box) without moving or dragging the box and then selecting the second portion. In any case, it is to be understood that moving may be done in some example embodiments using touch-based input by contacting, with a finger, the area of the display presenting a portion of the outline/box, and/or contacting an area of the display inside the outline/box, and then moving the finger against the display to the second location without breaking contact with the display. Releasing may be then be done by removing the finger from contact with the display once at the second location.

As another example, moving may be done using a mouse or touch pad to control a cursor presented on the display to juxtapose the cursor over an area of the display presenting a portion of the outline/box, and/or over an area inside the outline/box, depressing and holding a selection button (e.g., typically the left button on a mouse), moving the cursor with the selection button still depressed to drag the outline/box to the second portion, and then releasing the selection button.

Still in reference to FIG. 3, after block 308 the logic moves to block 310 where the logic, responsive to receipt of the second user input, zooms in on the second portion to a same zoom amount as the first portion was presented in at block 302, or at least substantially the same zoom amount as the first portion, was presented in at block 302 (e.g., as close to the same amount as the processor in the present device is able to zoom). Thus, the above ways tor moving the indication(s) and/or causing the zoom in do not call for unduly repetitive and annoying gestures.

Figure 4:
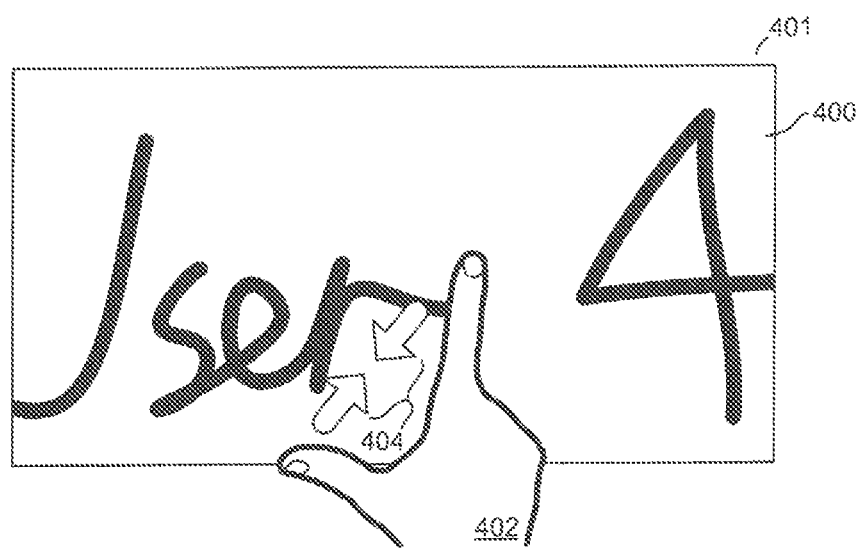
FIGS. 4-7 are example illustrations in accordance with present principles.

Referring now to FIG. 4, it shows a first portion 400 of a UI as presented on a display 401 but not presenting the entirety of the UI. The first portion 400 is an example of what may be presented at block 302 as described above. Note that the portion 400 partially presents the letter "u" along with the letters "ser" and the number four. For illustration, a hand 402 of a user is shown as performing a zoom out gesture by moving an index linger and thumb together as represented by the arrows 404. This gesture is one example of how a zoom out command and/or a command to present an expanded view may be provided to the device.

Figure 5:
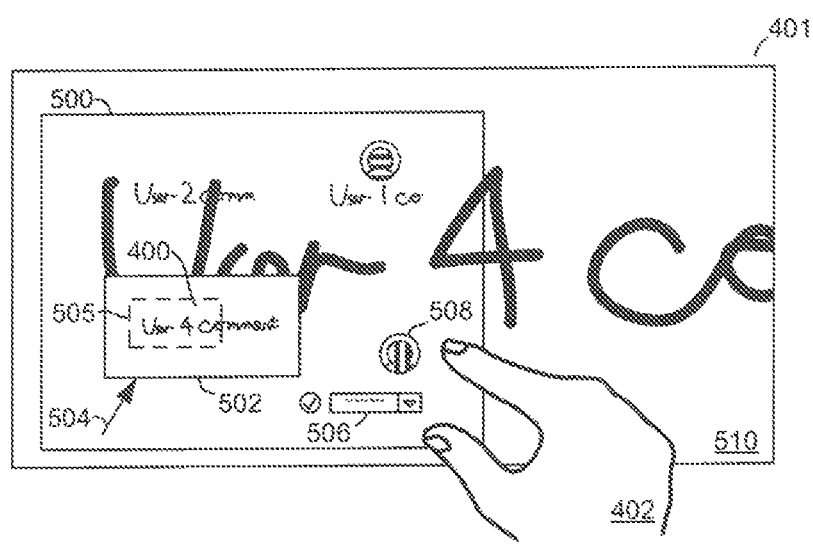

Responsive to receipt of such a gesture at the device, an expanded view 500 of the UI may be presented as shown in FIG. 5. The expanded view 500 is understood to comprise content that was not included in the first portion 400, such as the letters "user 2 comm", or in other examples, files, images, videos, sketches, folders, selectors, etc. Furthermore, the expanded view 500 shown is understood to be a view of the entirety of the UI, though in some embodiments a view may be expanded as discussed herein but still not show the entirety of the UI.

As may be appreciated from FIG. 5, the expanded view 500 comprises one or more indications of the location in the expanded view 500 at which the content of the first portion 400 is presented and hence where the content from the first portion is juxtaposed on the UI itself. Examples of these indications include a box 502 (that may be a certain color such as red) surrounding the first portion 400 and an arrow 504 pointing to the first portion 400. Although the box 502 is shown as at least surrounding the first portion 400 and including area of the UI beyond the first portion 400, in some embodiments the box may establish an outline of the perimeter of the first portion 400 itself (e.g., a box may be presented along the perforated lines 505 shown to illustrate the bounds of the first portion 400 itself).

As may also be appreciated from FIG. 5, content 506 is presented as it is created at least substantially in real time at another device its communication with the device presenting the expanded view 500 owing to the UI being simultaneously accessible at the other device. An avatar 508 is one example of metadata that may be presented on the expanded view 500 that identifies the creator of the content 506 and/or the device at which the content 506 is created.

Still further, in some example embodiments, portions of the expanded view 500 not comprising the first portion 400 and/or not comprising the area within the box 502 may be presented in at least partially grayed and/or translucent form as shown while the first portion 400 is presented in the expanded view 500 with at least substantially the same amount of luminosity as the first portion 400 was presented prior to receipt of the user input to present the expanded view, which in this case is greater than the luminosity of the grayed out and/or translucent areas(s).

Before moving on to the description of the next figure, it is to be understood in reference to FIG. 5 that in some example embodiments, the expanded view 500 may be superimposed and/or overlaid on another, more zoomed in view 510 that presents the same or at least substantially the same content (e.g., there may be slightly more or less content around the edges of the view 510) that is included within the bounds of the box 502 but with a zoom amount equal to or at least substantially the same as the zoom amount used to present the content prior to receipt of the user input to present the expanded view 500 which correspondingly caused the expanded view 500 to be presented.

Figure 6:
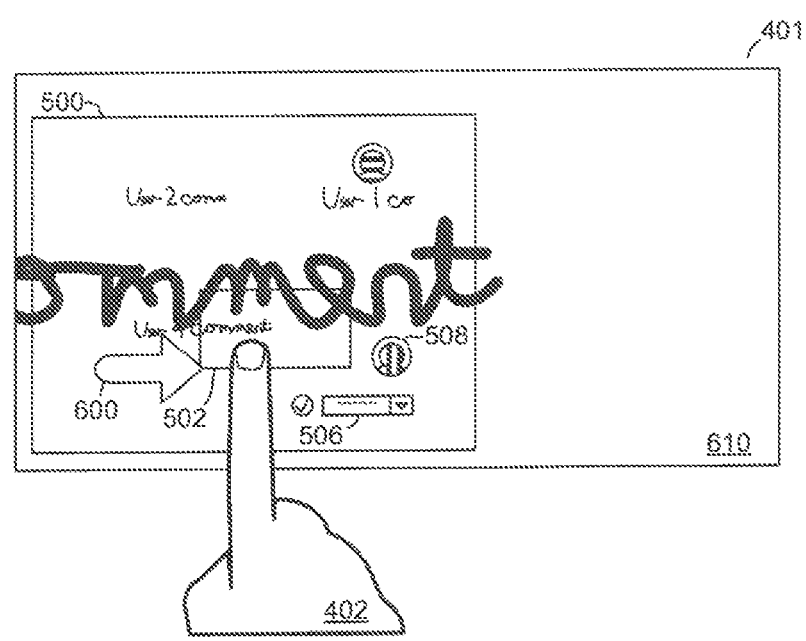

Now in reference to FIG. 6, it may be appreciated that the hand 402 is dragging the box 502 in a direction illustrated by arrow 600. Note that a background view 610 again presents the same or at least substantially the same content that is currently included within the bounds of the box 502 and is not entirely occluded by the expanded view 500 (which maybe translucent to not occlude the background view 610). It is to therefore be understood that such background views as presented on the display 401 may continually update in real time, or at least substantially in real time, as the box 502 moves so that it shows in real time the same content as within the box 502 but in a magnified view, which provides certain benefits such as the ability to clearly perceive content within the box 502 via such a background view if the content is too small to read from within the expanded view 500 itself.

Figure 7:
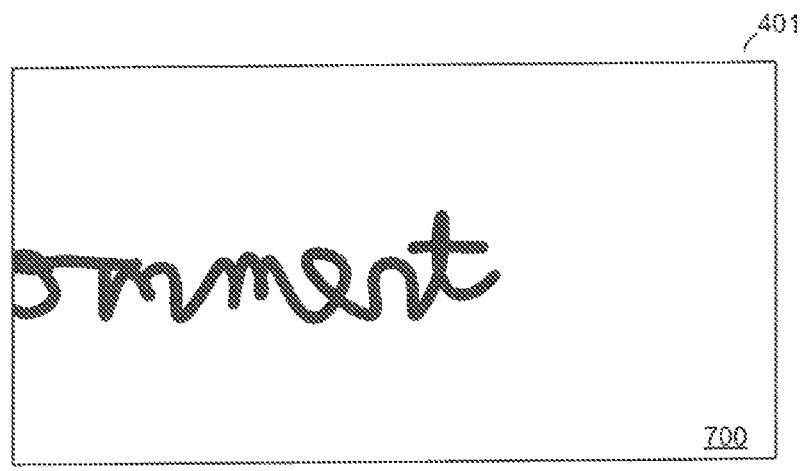

In any case, it is to be understood that responsive to cessation of the drag action of the box 502 using hand 402, the content shown in the expanded view 500 that is within the box 502 when cessation occurs is then automatically presented as shown in example FIG. 7 as view 700 with a zoom amount corresponding to the zoom amount used to present the content of the portion 400 as shown in FIG. 4.

Figure 8:
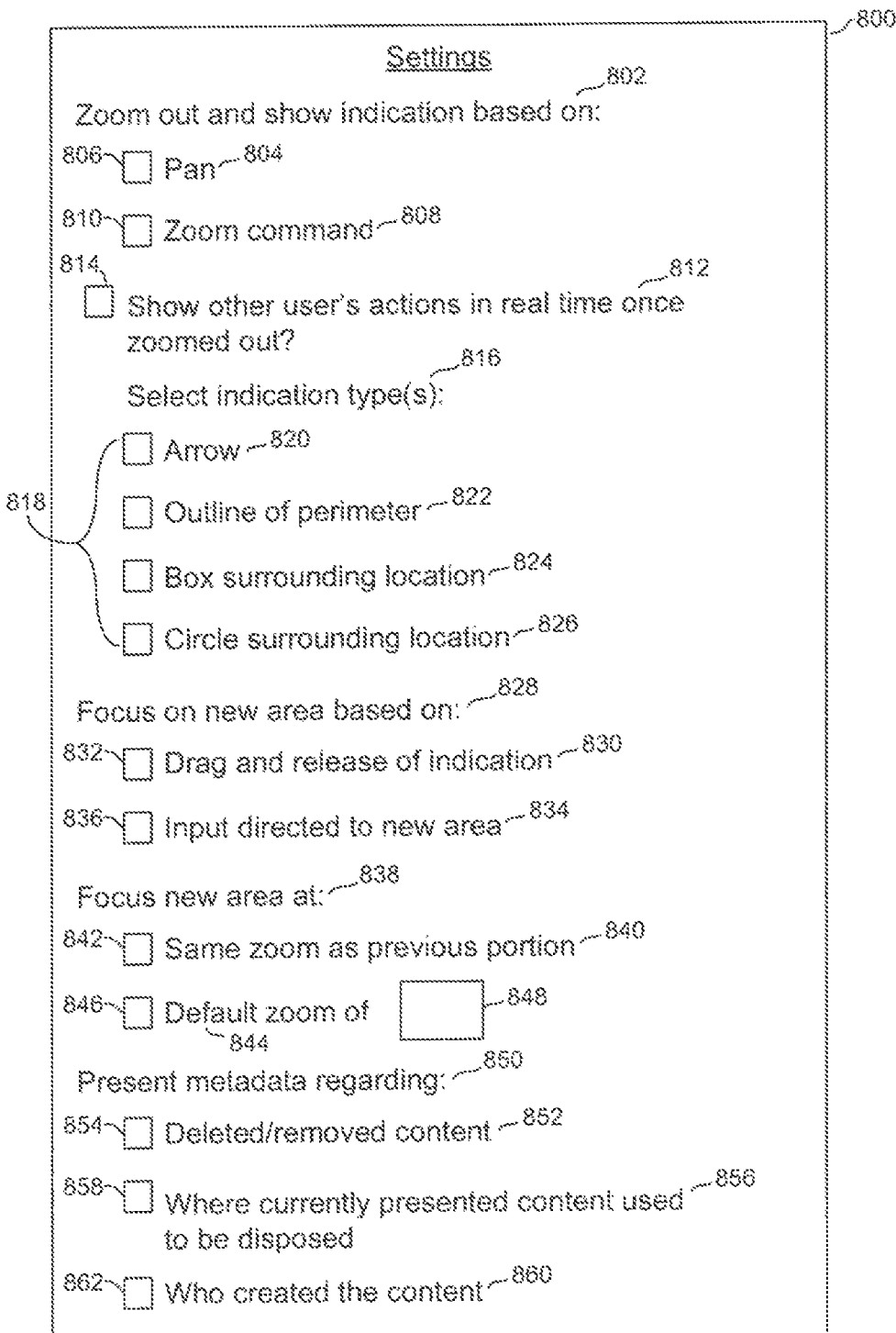
FIG. 8 is an example settings user interface (UI) in accordance with present principles.

Before describing FIG. 8, it is to be understood that in addition to or in lieu of dragging or moving the box as shown in FIG. 6 (using touch input as shown, and/or by controlling a cursor using a mouse as discussed herein), a portion of the area of the expanded view at which the box 502 is disposed as shown in FIG. 6 may instead merely be touched or selected by the user without moving or dragging the box and/or while the box 502 is still in the position shown in FIG. 5, which may then automatically cause the view 700 to be presented with the view 700 centered at a point corresponding to the point of the touch contact and/or selection in the expanded view.

Now describing FIG. 8, it shows an example user interface 800 for configuring settings of a device and/or application undertaking present principles. The UI 800 may be presented in response to selection of a settings selector presented in one of the views discussed above in reference to FIGS. 4-7 (e.g., in the expanded view, and/or overlaid on a portion of the background view outside the expanded view) even though not shown in those figures for simplicity.

The UI 800 includes at least a first setting 802 for configuring one or more ways to invoke an expanded view in accordance with present principles, such as responsive to input to pan across a UI (option 804 selectable using check box 806) and/or responsive to input to zoom in (option 808 selectable using check box 810). The UI 800 also includes a setting 812, enableable responsive to selection of check box 814, to show other user's actions at a UI in real time using other devices at least while an expanded view of the UI is presented on the device presenting the UI 800, if not also showing these actions while a zoomed in view of a portion of the UI is presented as may occur in some embodiments.

The UI 800 may further include a setting 816 for selecting one or more types of indications that may be presented in an expanded view to indicate a location within the expanded view of a portion of a UI that was previously being viewed at a more magnified level prior to presentation of the expanded view as disclosed herein, and/or indications that may be moved within the expanded view to another area of the UI to then cause another magnified view to be presented as also disclosed herein. The setting 816 thus has one or more options associated therewith that are respectively selectable using respective check boxes 818 to enable usage of an indication associated with the respective option, such as an option 820 to use an arrow as an indication, an option 822 to use an outline of a perimeter of an area of the UI at which content that was previously zoomed in on was presented, an option 824 to use a box at least surrounding such an area, and an option 826 to use a circle at least surrounding such an area.

Still in reference to FIG. 8, the UI 800 may also include a setting 828 to configure focusing and/or zooming in on an area of a UI as disclosed herein based on a drag and release of an indication presented in an expanded view (option 830 selectable using check box 832) and input directed to another area of the UI other than were an indication is presented without moving the indication itself (option 834 selectable using box 836). Additionally, a setting 838 may be included on the UI 800 to configure how the device is to focus on an area from an expanded view to which a box has been moved as disclosed herein and/or which is selected without moving such a box. Thus, an option 840 is presented that is selectable using check box 842 to focus/zoom in on such an area using the same zoom amount as a previously presented area of the UI prior to presentation of the expanded view (e.g., using the same zoom amount for a second portion as disclosed in reference to block 310 as was used tor a first portion as disclosed in reference to block 302 above). An option 844 is also presented that is selectable using check box 846 to instead use a default zoom amount corresponding to a zoom amount enterable by a user into entry box 848.

The UI of FIG. 8 may also include a setting 850 to present metadata in an expanded view of a UI as disclosed herein. Example options that may be included for such metadata includes an option 852 selectable using check box 854 to show indications of "ink history" such as content deleted and/or removed from the UI (and/or to show the content itself), an option 856 selectable using check box 858 to show indications of where content currently presented on the UI used to be presented (e.g., if it has been moved), and an option 860 selectable using check box 862 to show indications of users that created respective contents presented in the expanded view. Other examples of metadata that may be presented, though no corresponding option is shown on the UI 800 for simplicity, include metadata regarding content that has been scaled within the UI (e.g., from one size to another), metadata regarding content that has been rotated within the UI, metadata regarding content in the UI that has been that has been converted from one format to another format (e.g., file formats and/or media formats), metadata regarding gestures (e.g., hovers, touch-based gestures such as pointing and circling (e.g., using a finger or stylus) still other hand-based, mouse-based, and/or cursor-based gestures, etc.) being directed currently or that were previously directed to the UI at other devices and/or by other users (and/or other types of body language), metadata regarding where in the UI any user of the UI is looking or has looked (e.g., using another device), metadata regarding emotions experienced by users while looking at various portions of the UI (e.g., as determined using emotion recognition software to analyze one or more images of the users as they view(ed) the UI), metadata regarding which portion of the UI is being zoomed in on at a different device than the one presenting the UI 800 that has access to the UI (e.g., the metadata in this instance may be another box or arrow), metadata regarding biometric information of one or more users of the UI such as heart rates and blood pressure levels while looking at content in the UI (and/or more generalized biometric information that may be derived therefrom such as whether the user is tired, energized, confused, attentive, etc.), metadata regarding discussions and times of discussion of content shown in the UI, etc. Such metadata may be presented in the expanded view next to the location of the associated content itself.

More generally, expanded views and/or UI canvas previews as disclosed herein may be interactive, such as by using voice recognition at the device, to show and/or filter various types of metadata. For example, a user may provide input to the device presenting a canvas preview/expanded view requesting "showing me points in the timeline where conversations too place", and in response the device may present in the expanded view metadata at the location of the associated content, and/or adjacent to the location of the associated content, including times at which such conversations took place and even what the conversation was about (e.g., if a microphone was activated during the conversation from which input was received and on which voice recognition software was executed). As another example, a user may provide input requesting "show me a map of emotions and eye gazes when idea X was presented", or "show me a map of emotions and eye gazes when content X was presented", and in response the device may overlay on the expanded view and/or present therein metadata corresponding to this requested information. Yet another example is that a user may provide input requesting "playback gestures and audio from when idea X was created", or "playback gestures and audio from when content X was created", and in response the device may overlay on the expanded view and/or present therein metadata corresponding to this requested information. As but one last example, a user may provide input requesting "show me Jane's [another user] screenview and eye gaze during the current [UI editing] session", and in response the device may overlay on the expanded view and/or present therein metadata corresponding to this requested information.

Furthermore, it is to be understood that in some embodiments, the metadata discussed herein may be presented in zoomed in views such as the views shown in FIGS. 4 and 7, though in other embodiments it may only be presented in the expanded view. The metadata discussed herein may also be distinguished based on which user it is associated with, such as metadata being presented in different colors based on association with respective users.

Also, it is to be understood that an expanded view as disclosed may be invoked still other ways in addition to or in lieu of a pan command or zoom out command, such as responsive to selection of a selector in the zoomed in view for presenting the expanded view and/or based on the expanded view being set as the default view when the UI is first presented on a device during a UI session. This expanded view may consume an entire area of a display on which content is presentable, or it may consume only part of such an area and be presented with its center at a location on the display at which a gesture to invoke it was provided for at least as close to the location as it can be presented while still presenting the entire expanded view such as if the gesture was too close to the side of the display to center the expanded view thereat and still have it entirely presented). Furthermore, although the example embodiments discussed herein have referenced that an expanded view may be removed and another zoomed in view presented based on things such as cessation of a drag of a box, this may also occur when a user taps or selects an area outside the expanded view, which would then cause a zoomed in view to be presented corresponding to wherever the indication (e.g., box) was disposed within the expanded view at the moment of the tap outside expanded view (e.g., whether the box was moved by the user or not).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular ZOOMING AND PANNING WITHIN A USER INTERFACE is herein shown and described in detail, it is to be understood that the subject matter which is encompassed by the present application is limited only by the claims.

What is claimed is:

1. A first device, comprising:
at least one processor;
a display accessible to the at least one processor; and
storage accessible to the at least one processor and bearing instructions executable by the at least one processor to:
present a first portion of a user interface (UI) on the display, the UI being manipulable by plural users using respective devices, the UI being manipulable to at least create content within the UI;
receive user input to present an expanded view of the UI, wherein the expanded view comprises metadata visually indicating at least one user action taken at the UI, wherein the metadata visually indicates at least one user action taken at the UI via text that is presented on the UI and that reflects the metadata;
in response to receipt of the user input to present an expanded view of the UI, present the expanded view of the UI along with the first portion and an indication of a location in the expanded view of the first portion of the UI;
receive user input to filter at least one type of metadata;
responsive to receipt of the user input to filter at least one type of metadata, present at least one type of metadata indicated via the user input to filter at least one type of metadata, wherein presenting the at least one type of metadata comprises presenting text; and
responsive to receipt of the user input to filter at least one type of metadata, not presenting at least one type of metadata that was not indicated via the user input to filter at least one type of metadata.

2. The first device of claim 1, wherein at least some text comprises one or more of: at least one indication that content has been removed from the UI, at least one indication that content has been moved within the UI.

3. The first device of claim 1, wherein at least some text comprises at least one indication of content that has been scaled within the UI.

4. The first device of claim 1, wherein at least some text comprises at least one indication of content that has been rotated within the UI.

5. The first device of claim 1, wherein at least some text comprises at least one indication of content in the UI that has been that has been converted from one format to another format.

6. The first device of claim 1, wherein at least some text comprises at least one indication of a gesture being directed to the UI using a second device different from the first device.

7. The first device of claim 1, wherein at least some text comprises at least one indication of where in the UI a user is looking.

8. The first device of claim 1, wherein at least some text comprises at least one indication of at least one emotion of a user while looking at the UI.

9. The first device of claim 1, wherein at least some of the metadata comprises at least one indication of a view of a second portion of the UI, but not all of the UI, that is concurrently presented at a second device different from the first device.

10. The first device of claim 9, wherein the indication of the view of the second portion of the UI comprises a box that outlines the second portion of the UI.

11. A method, comprising:
presenting a first portion of a user interface (UI) on a display of a first device, the UI being manipulable by plural users using respective devices, the UI being manipulable to at least create content using the UI;
receiving user input to zoom out in the UI;
in response to receiving the user input to zoom out in the UI, zooming out in the UI to show at least one additional portion of the UI beyond the first portion and presenting an indication of a location of the first portion of the UI, the UI also presenting text indicating an interaction with the UI from a second device different from the first device;
receiving user input to filter at least one type of metadata;
presenting, responsive to receipt of the user input to filter at least one type of metadata, at least one type of metadata indicated via the user input to filter at least one type of metadata, wherein presenting the at least one type of metadata comprises presenting text reflecting the metadata; and
not presenting, responsive to receipt of the user input to filter at least one type of metadata, at least one type of metadata that was not indicated via the user input to filter at least one type of metadata.

12. The method of claim 11, wherein the UI is manipulable via each respective device to create sketches.

13. The method of claim 11, wherein the UI is manipulable to present one or more of: files, videos, folders.

14. The method of claim 11, wherein the UI comprises text indicating at least one interaction with the UI from the first device.

15. The method of claim 14, wherein at least some text indicates a particular user that created a piece of content that is currently presented on the UI.

16. The method of claim 14, wherein at least some text indicates at least one biometric of a particular user while the particular user looks at a portion of the UI.

17. The method of claim 14, wherein at least some text pertains to at least one discussion between users, the at least one discussion related to content presented on the UI, and wherein at least some text indicates information related to when the at least one discussion transpired.

18. A computer readable storage medium (CRSM) that is not a transitory signal and that is not a signal per se, the computer readable storage medium comprising instructions executable by a processor to:
present a first portion of a window on a display of a device, wherein the window presents at least one word indicating at least one user interaction with the window to create content presentable in the window;
receive first user input;
in response to receipt of the first user input, zoom out from the first portion and present an expanded view of the window which shows at least one additional portion of the window other than the first portion;
in response to receipt of the first user input, present a visual indication within the expanded view of a location of the first portion, the visual indication being other than the first portion itself;
receive second user input to filter at least one type of metadata;
responsive to receipt of the second user input, present at least one type of metadata indicated via the second user input, wherein presenting the at least one type of metadata comprises presenting text reflecting the metadata; and responsive to receipt of the second user input, not presenting at least one type of metadata that was not indicated via the second user input.

19. The CRSM of claim 18, wherein the at least one word indicates a location on the window at which content was previously located but is no longer located.

* * * * *